United States Patent
Liao et al.

(10) Patent No.: US 6,360,195 B1
(45) Date of Patent: Mar. 19, 2002

(54) TELEVISION OR RADIO CONTROL SYSTEM DEVELOPMENT

(76) Inventors: Hongtao Liao, 4, rue du Canal, F-78180 Montigny-Btx; Rui Liang Yang, 6, rue Nicholas Chuquet, F-75017 Paris, both of (FR)

( * ) Notice: Subject to any disclaimer, the term of this patent is extended or adjusted under 35 U.S.C. 154(b) by 0 days.

(21) Appl. No.: 09/400,312

(22) Filed: Sep. 21, 1999

Related U.S. Application Data

(63) Continuation of application No. PCT/EP97/02113, filed on Apr. 25, 1997.

(51) Int. Cl.[7] .............................................. G06F 11/263
(52) U.S. Cl. ........................... 703/28; 703/21; 702/120; 348/180; 348/720
(58) Field of Search ............................. 703/22, 21, 28; 380/217; 348/180, 720; 702/120

(56) References Cited

U.S. PATENT DOCUMENTS

| | | | |
|---|---|---|---|
| 5,490,096 A | * | 2/1996 | Seto ............................. 703/13 |
| 6,009,256 A | | 12/1999 | Tseng et al. ................... 703/13 |
| 6,028,996 A | * | 2/2000 | Sniderman et al. ........... 703/28 |
| 6,044,397 A | | 3/2000 | Elefteriadis et al. ........ 725/139 |
| 6,167,083 A | | 12/2000 | Sporer et al. .......... 375/240.01 |

FOREIGN PATENT DOCUMENTS

| | | |
|---|---|---|
| WO | WO 86/06519 | 11/1986 |
| WO | WO 95/15658 | 6/1995 |

OTHER PUBLICATIONS

Beling, S. et al. "An In–Circuit Signal Analyzer for Mixed Signal Digital Signal Processor," 1991 Int'l Conf. on Acoustics, Speech, and Signal Processing (ICASSP–91), vol. 2, Apr. 1991, pp. 1109–1112.*

Melear, Charlie "Small Evaluation Boards Provide Flexibility and Economy," Electro, vol. 19, No. 3, November 1986, pp. 1–9.

Copy of International Search Report issued Dec. 4, 1997, Application No. PCT/EP97/02113, 3 pages.

* cited by examiner

*Primary Examiner*—Kyle Choi
(74) *Attorney, Agent, or Firm*—Sterne Kessler Goldstein & Fox P.L.L.C.

(57) ABSTRACT

A digital television satellite or cable system broadcasts to receiver/decoders which also receive control information (control programs, i.e. applications) to allow such tasks as reviewing television programme listings, setting up home banking interactions, and answering quiz questions connected with programmes being transmitted. The invention provides a method of developing such control programs on a workstation 4013. The workstation is coupled to a receiver/decoder-type unit 2021 which substantially duplicates the receiver/decoder with a television set 2023 coupled thereto. Control programs are developed including control statements responsive to signals from the workstation and test statements which return signals to the workstation. The program is passed to the receiver/decoder-type unit, and a synthetic broadcast digital television signal is generated (at 4045) and fed to the receiver/decoder-type unit. The control program is then run on the receiver/decoder-type unit, the program responding to control signals from the workstation and returning test signals thereto.

10 Claims, 4 Drawing Sheets

TELEVISION OR RADIO CONTROL SYSTEM DEVELOPMENT

This is a continuation of Application number PCT/EP97/02113, filed Apr. 25, 1997.

The present invention relates to TV (television) or radio control systems, and more specifically to the development and testing (debugging) of such systems. It finds particular application in a broadcast and reception system for use in digital interactive satellite television system. However, it will be realized that it is not limited to that system or systems of that type, but is applicable more generally to a variety of TV and/or radio systems, including for example those capable of broadcasting software.

A TV control system has been developed which is transmitted over satellite or cable links. Each end user has a receiver/decoder which receives control information, which can then be used for a variety of tasks such as reviewing TV programme listings, setting up home banking interactions, answering quiz questions relating to programmes being transmitted, and so on.

The digital TV system is an interactive system using a DVB/MPEG2 technique, which involves compressing the audio signals, data, and video images being transmitted. The MPEG system can also accommodate a considerable quantity of information of a "private" nature, i.e. not directly associated with the main programme being transmitted. This private sub-channel can be used by the broadcast supplier to transmit information such as TV programme listings.

The receiver/decoder can potentially require a large number of control functions or programs, which would require a large amount of memory to store them. Also, the broadcast supplier may wish to introduce further control programs, and may wish to update existing control programs. The system is therefore designed to allow the control programs to be broadcast repeatedly by the broadcast supplier (using the private sub-channel). The receiver/decoder has built into it an initial control program which performs an initializing or boot procedure, but then picks up from the broadcast signal whatever particular further control programs it needs to respond to the particular requirements of its user.

This means that the broadcast supplier can update existing control programs and introduce fresh ones extremely easily; the resulting improved and new services will automatically be immediately available to all users. However, such modification or development of services (control programs), carries with it its own problems and dangers. A particular problem or danger is that of errors (bugs). It is very important for the incidence of bugs to be kept extremely low, since any bugs will be broadcast to all users and can thus quickly cause widespread dissatisfaction and irritation.

The main aspect of the present invention is concerned with the development of control programs with rapid and effective fault (bug) detection.

Accordingly the present invention provides a method of developing, on a computer workstation, a control program for a broadcast digital television or radio system in which a receiver/decoder extracts broadcast control programs from the broadcast television or radio signal and controls a television or radio set in response thereto, the method comprising: coupling the workstation to a receiver/decoder-type unit which substantially duplicates the receiver/decoder with a television or radio set coupled thereto; developing the control program on the workstation; passing the program to the receiver/decoder-type unit; feeding an MPEG digital television or radio signal to the receiver/decoder-type unit; running the program on the receiver/decoder-type-unit; passing control signals from workstation to the receiver/decoder type unit to control the running of the program thereon; the receiver/decoder type unit and the program responding to the control signals and returning test signals to the workstation.

Preferred features of the present invention will now be described, purely by way of example, with reference to the accompanying drawings, in which.

Figure 1:
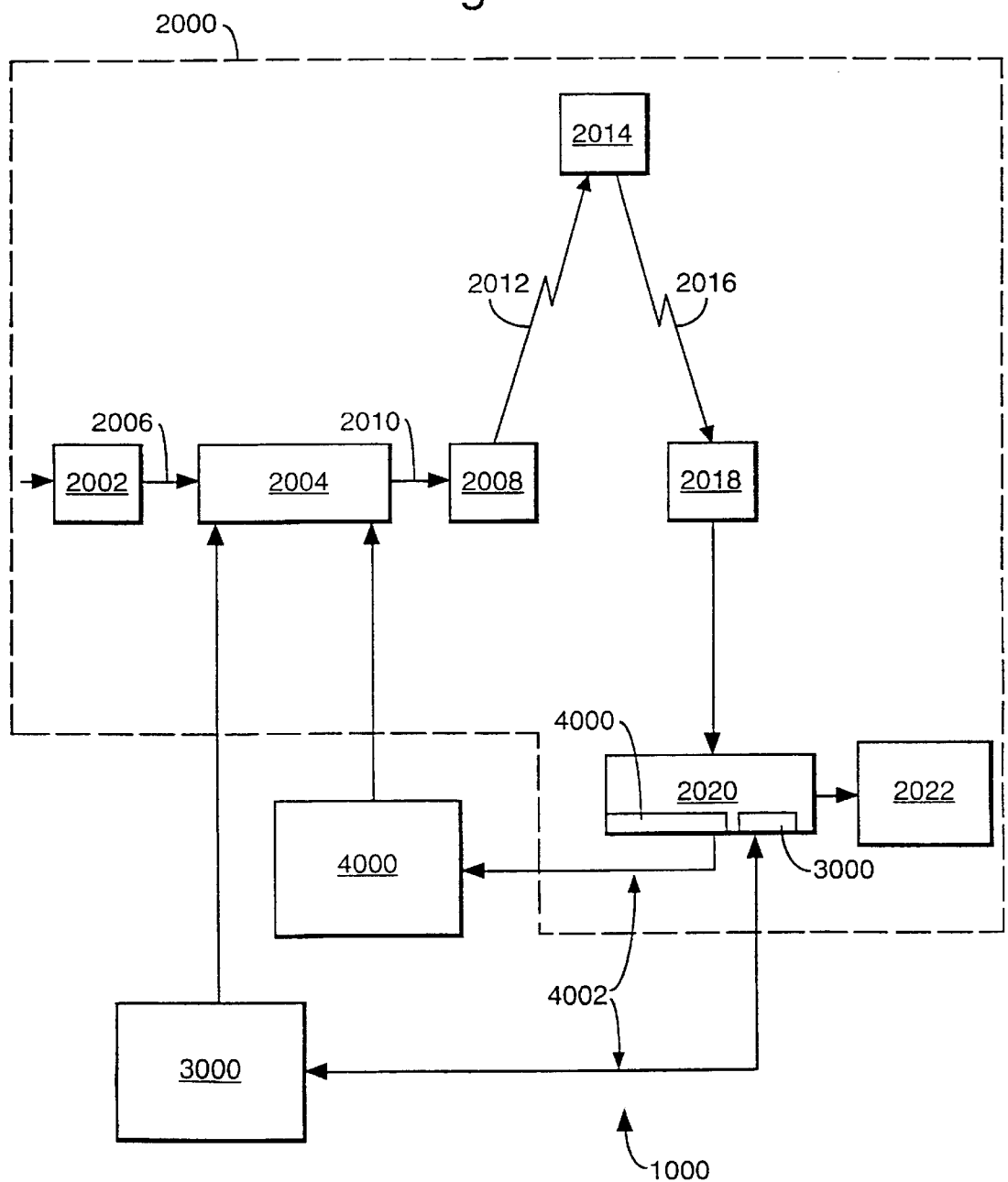
FIG. 1 shows the overall architecture of a digital television system according to the preferred embodiment of the present invention.

An overview of a digital television system 1000 is shown in FIG. 1. The invention includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2020. Using the decoder 2020 and smartcard, the end user may purchase commercial offers in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

Figure 2:
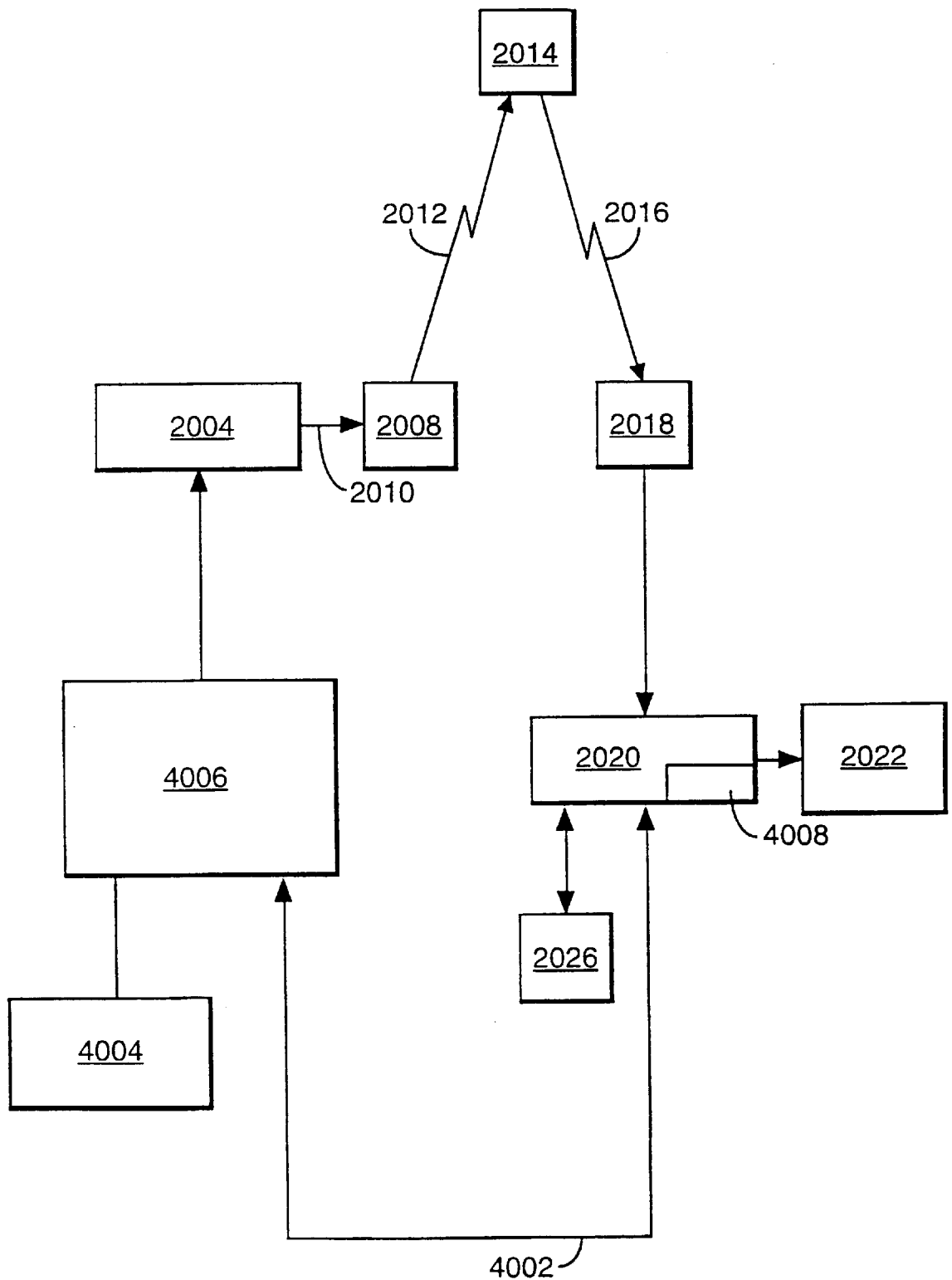
FIG. 2 shows the architecture of an interactive system of the digital television system.

FIG. 2 shows the general architecture of the interactive television system 4000 of the digital television system 1000 of the present invention.

For example, the interactive system 4000 allows an end user to buy items from on-screen catalogues, consult local news and weather maps on demand and play games through his television set.

The interactive system 4000 comprises in overview four main elements:

an authoring tool 4004 at the broadcast centre (or elsewhere) for enabling a broadcast supplier to create, develop, debug and test applications;

an application and data server 4006 the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user;

a virtual machine including a run time engine (RTE) 4008, which is an executable code installed in the receiver/decoder 2020 owned or rented by the end user for enabling an end user to receive, authenticate, decompress, and load applications into the working memory 2024 of the receiver/decoder 2020 for execution. The engine 4008 also runs resident, general-purpose applications. The engine 4008 is independent of the hardware and operating system; and a modemmed back channel 4002 between the receiver/decoder 2020 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. Several modules may be required to make up an application. A "memory volume" of the receiver/decoder is a storage space for modules. An "interface" is used to download modules. Modules may be downloaded into the receiver/decode 2020 from the MPEG-2 transport stream.

The elements mentioned in the previous paragraph are now described in more detail.

For the purposes of this specification, an application is a piece of computer code for controlling high level functions of preferably the receiver/decoder 2020. For example, when the end user positions the focus of a remote controller on a button object seen on the screen of the television set 2022 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM or FLASH memory of the receiver/decoder 2020.

Examples of applications are:

An Initiating Application. The receiver/decoder 2020 is equipped with a resident initiating application which is an adaptable collection of modules (this term being defined in more detail hereunder) enabling the receiver/decoder 2020 to be immediately operative in the MPEG-2 environment. The application provides core features which can be modified by the broadcast supplier if required. It also provides an interface between the resident application and downloaded applications.

A Startup Application. The startup application allows any application, either downloaded or resident, to run on the receiver/decoder 2020. This application acts as a bootstrap executed on arrival of a service in order to start the application. Startup is downloaded into RAM and therefore can be updated easily. It can be configured so that the interactive applications available on each channel can be selected and run, either immediately after downloading or after preloading. In the case of preloading, the application is loaded into the memory 2024 and is activated by the startup when required.

A Program Guide. The Program Guide is an interactive application which gives full information about programming. For example, it may give information about, say, one week's television programmes provided on each channel of a digital television bouquet. By depressing a key on the remote controller 2026, the end user accesses an add-on screen, overlaid on the event shown on the screen of the television set 2022. This add-on screen is a browser giving information on the current and next events of each channel of the digital TV bouquet. By depressing another key on the remote controller 2026, the end user accesses an application which displays a list of information on events over one week. The end user can also search and sort events with simple and customised criteria. The end user can also access directly a selected channel.

A Pay Per View application. The Pay Per View Application is an interactive service available on each PPV channel of the digital TV bouquet in conjunction with the conditional access system 3000. The end user can access the application using a TV guide or channel browser. Additionally, the application starts automatically as soon as a PPV event is detected on the PPV channel. The end user is then able to buy the current event either through his daughter smartcard 3020 or via the communication server 3022 (using a modem, a telephone and DTMF codes, MINITEL or the like). The application may be either resident in the ROM of the receiver/decoder 2020 or downloadable into the RAM of the decoder 2020.

A PC Download application. On request, an end user can download computer software using the PC download application.

A Magazine Browser application. The magazine browser application comprises a cyclic video broadcast of images with end user navigation via on-screen buttons.

A Quiz application. The quiz application is preferably synchronised with a broadcast quiz programme. As an example, multiple choice questions are displayed on the screen of the television 2022, and the user can select an answer using the remote controller 2026. The quiz application can inform the user whether the answer is correct or not, and can keep count of the user's score.

A Teleshopping application. In one example of the teleshopping application, offers of goods for sale are transmitted to the receiver/decoder 2020 and displayed on the television 2022. Using the remote controller, the user can select a particular item to buy. The order for the item is sent via the modemmed back channel 4002 to the application and data server 4006 or to a separate sales system the telephone number of which has been downloaded to the receiver/decoder, possibly with an order to debit the account for a credit card which has been inserted into one of the card readers 4036 of the receiver/decoder 2020.

A Telebanking application. In one example of the telebanking application, the user inserts a bank card into one of the card readers 4036 of the receiver/decoder 2020. The receiver/decoder 2020 dials up the user's bank, using a telephone number stored in the bank card or stored in the receiver/decoder, and then the application provides a number of facilities which can be selected using the remote controller 2026, for example for downloading via the telephone line a statement of account, transferring funds between accounts, requesting a cheque book, etc.

An Internet Browser application. In one example of the Internet browser application, instructions from the user, such as a request to view a web page having a particular URL, are entered using the remote controller 2026, and these are sent by the modemmed back channel 4002 to the application and data server 4006. The appropriate web page is then included in the transmissions from the broadcast centre, received by the receiver/decoder 2020 via the uplink 2012, transponder 2014 and downlink 2016, and displayed on the television 2022.

Applications arc stored in memory locations in the receiver/decoder 2020 and represented as resource files. The resource files comprise graphic object description unit files, variables block unit files, instruction sequence files, application files and data files.

The graphic object description unit files describe the screens, the man-machine interface of the application. The variables block unit files describe the data structures handled by the application. The instruction sequence files describe the processing operations of the applications. The application files provide the entry points for the applications.

The applications constituted in this way can use data files, such as icon library files, image files, character font files, colour table files and ASCII text files. An interactive application can also obtain on-line data by effecting inputs and/or outputs.

The engine 4008 only loads into its memory those resource files it needs at a given time. These resource files are read from the graphic object description unit files, instruction sequence files and application files; variables block unit files are stored in memory following a call to a procedure for loading modules and remain locked there until a specific call to a procedure for unloading modules is made.

Figure 3:
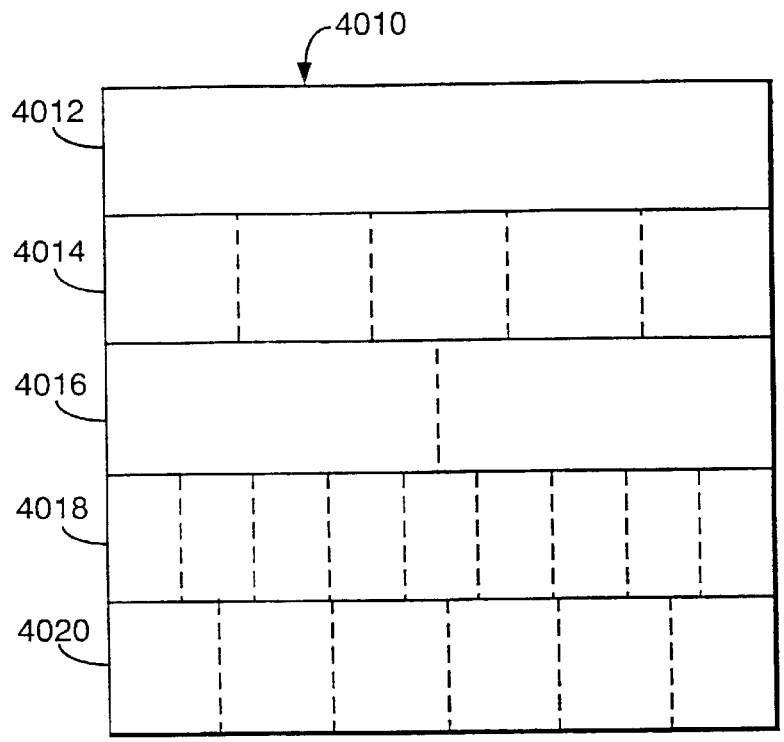
FIG. 3 shows the arrangement of files within a module downloaded into the memory of an interactive receiver/decoder.

With reference to FIG. 3, a module 4010, such as a tele-shopping module, is a set of resource files and data comprising the following:

a single application file 4012;

an undetermined number of graphic object description unit files 4014;

an undetermined number of variables block unit files 4016;

an undetermined number of instruction sequence files 4018; and where appropriate, data files 4020 such as icon library files, image files, character font files, colour table files and ASCII text files.

In the MPEG data stream, each module comprises a group of MPEG tables. Each MPEG table may be formatted as a number of sections. In the MPEG data stream, each section has a "size" of up to 4 kbytes. For data transfer via the serial and parallel port, for example, modules similarly are split into tables and sections, the size of the section varying with the transport medium.

Modules are transported in the MPEG data stream in the form of data packets of typically 188 bytes within respective types of data stream, for example, video data streams, audio data streams and teletext data streams. Each packet is preceded by a Packet Identifier (PID) of 13 bits, one PID for every packet transported in the MPEG data stream A programme map table (PMT table) contains a list of the different data streams and defines the contents of each data stream according to the respective PID. A PID may alert a device to the presence of applications in the data stream, the PID being identified using the PMT table.

Figure 4:
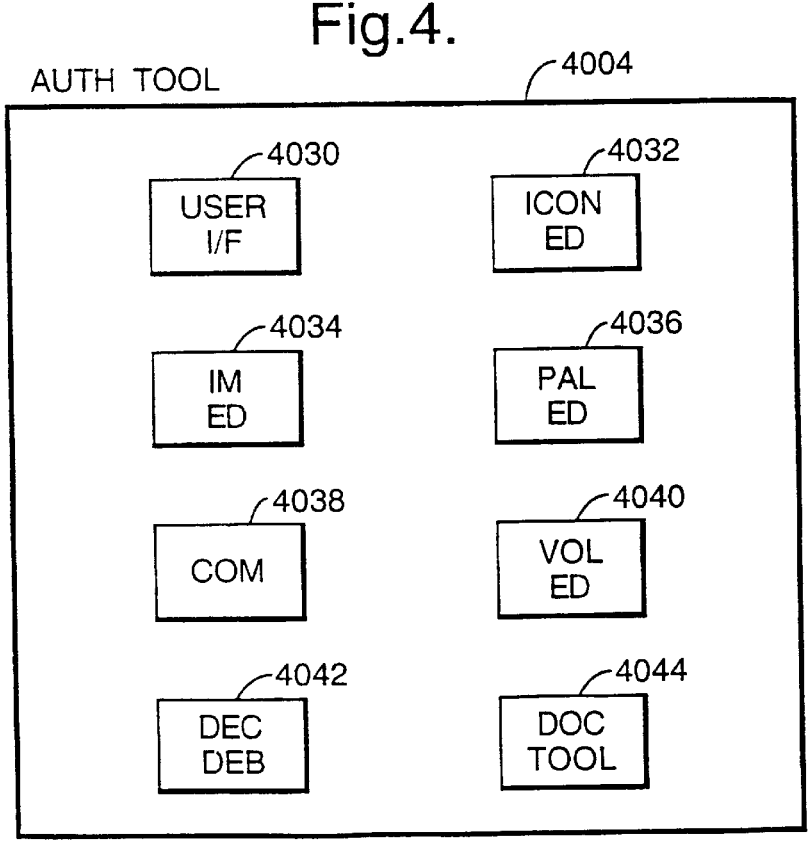
FIG. 4 is a more detailed block diagram, of the functional organization of an authoring tool.

The authoring tool 4004 comprises a fully integrated application development package, typically implemented through software, running on a UNIX computer workstation at the broadcast centre. With reference to FIG. 4, the Authoring Tool comprises:

a user interface generator 4030, comprising a multi-window graphical tool for the creation and modification of the application, which may comprise graphic object description unit files and assets such as buttons, input boxes and icons;

an icon editor 4032 for creating and modifying icons and storage in libraries;

an image editor 4034 for creating and modifying an image file;

a palette editor 4036 for creating and modifying a palette of colours;

a compiler 4038 for writing application instruction sequences in a computer-like language, producing "p-code";

a volume editor 4040 for creating a volume (a downloaded unit) from one or more modules 4010 generated by the compiler 4038;

a decoder debugger 4042 for defining and controlling the execution of instruction sequences; and a documentation tool 4044 for providing easy access to a description of all the functions which can be used to program instruction sequences for application call-back procedures.

Figure 5:
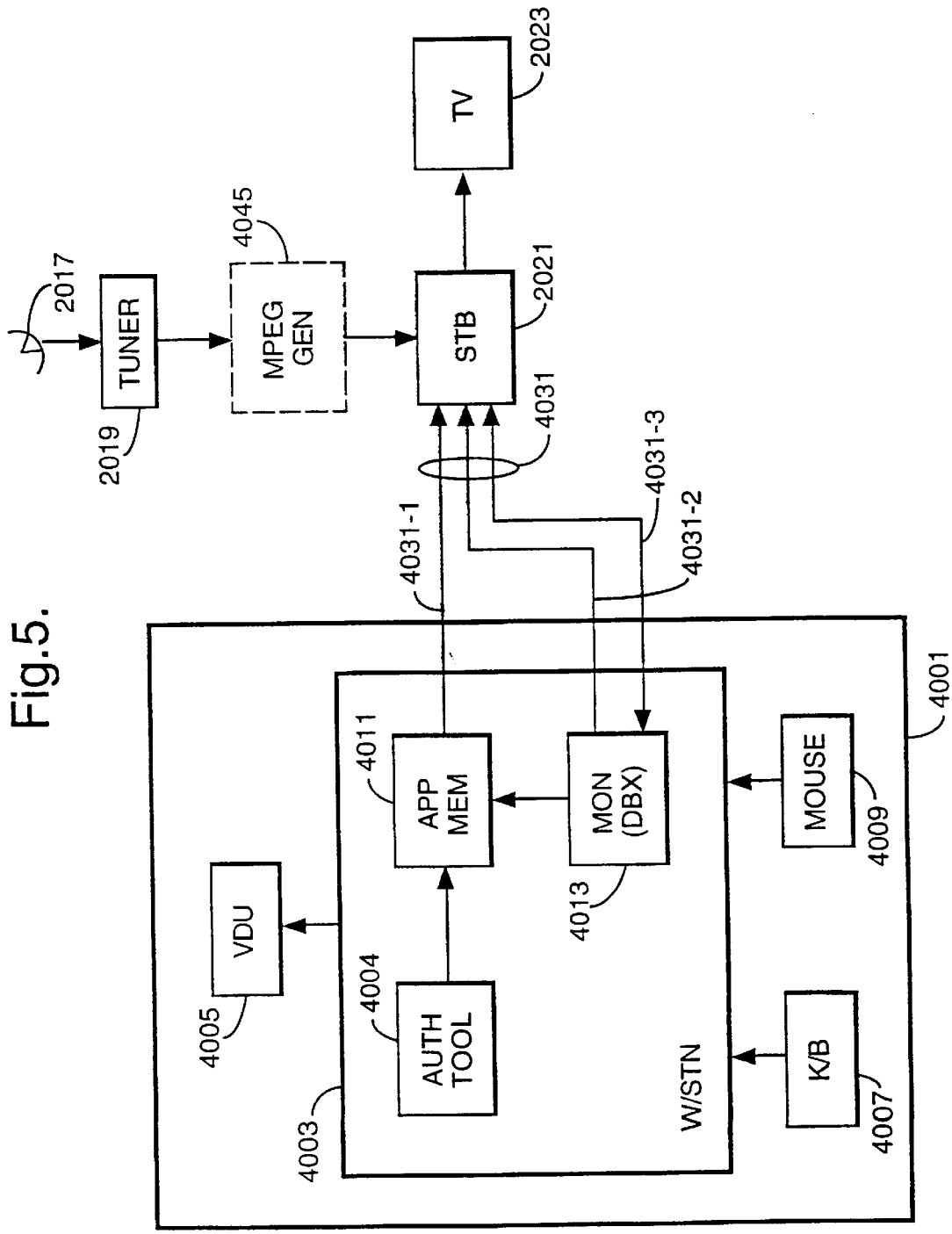
FIG. 5 is a block diagram of the parts of the system used for developing and testing an application.

Referring to FIG. 5, an application is developed using a portion 4001 of the interactive system 4000. The relevant part of the interactive system for present purposes is a UNIX workstation 4003 having coupled to it a VDU 4005, a keyboard 4007, and a mouse 4009. Once the application has been developed, it is stored in an application memory 4011 in the workstation.

The "p-code" which is produced by the compiler is a binary code. This code is interpreted by the receiver/decoder, and more precisely by the run time engine 4008 in the receiver/decoder. This code is hardware-independent, so that it will run on different designs of receiver/decoder implemented by different manufacturers using different hardware (though of course conforming to the same functional specification). Full-loading of the code is not required to run the application.

Once the application has been designed and developed using the authoring tool 4004, it can be partially or fully tested so that any errors may be detected and modifications and corrections may be made and checked easily.

Referring to FIG. 5, this is done on a system comprising the portion 4001 of the interactive system 4000, which is coupled to a television set 2023 via a receiver/decoder-type unit 2021. The relevant part of the interactive system for present purposes is a UNIX workstation 4003 together with the VDU 4005, the keyboard 4007, and the mouse 4009. The receiver/decoder-type unit 2021 is similar to the receiver/decoders used by end users of the broadcast system, but may have certain additional functionalities, as discussed below; the television set 2023 is identical to the television sets 2022 used by such end users.

In many instances, the new application will be intended to operate on existing television broadcasts. The receiver/decoder unit 2021 is therefore coupled to a tuner 2019, which is in turn fed from a television aerial dish 2017. (The tuner 2019 and aerial 2017 may be identical to those used by end users of the broadcast system.) The full MPEG-2 bitstream is received at the dish 2017 and demodulated at the tuner 2019 and fed through the receiver/decoder 2021 to the television 2023.

To test an application intended to operate on existing broadcasts, the application is downloaded into the receiver/decoder from the application memory 4011 over a channel 4031-1 to a port (which may be either a serial or a parallel port) in the receiver/decoder. The receiver/decoder extracts any data signals from the MPEG bitstream and processes them in accordance with any applications contained in the receiver/decoder; in this case, the new application being tested.

In some situations, the application being developed may require additional control signals in the MPEG bitstream which arc not present in the bitstream actually being broadcast. In such a situation, an MPEG bitstream generator 4045 is provided, coupled to the interactive system 4000. This generator 4045 may be wholly driven by the workstation 4003, with the workstation generating an artificial video signal as well as all the required control signals. Alternatively, the generator 4045 may be fed with the signal from the aerial 2017 and merely insert the appropriate control signals into the received bitstream (or modify the existing control signals in the received bitstream appropriately).

If the generator 4045 is used, then the application can, if desired, be injected into the MPEG bitstream instead of being passed to the receiver/decoder 2021 over the link 4031-1.

The workstation 4003 includes a test or monitor (debugging) tool 4013. To test an application after downloading it into the receiver/decoder, the monitor 4013 monitors the running of the application in the receiver/decoder. As discussed above, the receiver/decoder includes an interpreter which interprets the statements in the applications, and the applications are written in the appropriate form for this. The monitor 4013 can pass control signals to the receiver/decoder over a link 4031-2, and receive signals back therefrom over a link 4031-3. (The links 4031-1, 4031-2, and 4031-3 are logically distinct, but may all share a common physical channel.) The receiver/decoder and the monitor effectively operate respectively as a server and a client.

The monitor unit can monitor variables in the application, a list of variables to be monitored being defined for this purpose. The values of the defined variables can be displayed at defined points in the execution of the application, and/or the values of variables can be displayed (along with the variable names) on any change of value. Further, the tester can be used to insert desired variable values into the receiver/decoder; this gives the operator the ability to see almost immediately what the effect of setting variables to different values will have. These variable control functions can, of course, also be cleared by the monitor (as all monitor functions can be cleared).

Similarly, the monitor can set the decoder to signal when other types of entity, such as modules, variables block unit files, and objects, are encountered during the running of the application.

The monitor can also control the execution of the application, by inserting break-points (and deleting them). More specifically, execution may be allowed to run without interruption, to run to a break-point and stop, to run to a break-point and step on (restart) when desired, to run to a subroutine call or return from a subroutine, or to proceed step by step (ie stepping on from each statement only in response to the operator), either between defined points and/or defined sub-routines or for the full application. (A sub-routine may be an instruction sequence, which is a sequence a of statements which can be called or executed by the application.)

The monitor can operate a trace function, which detects and signals one or more of a variety of operations such as continuing, loading, returning or jumping to, starting or ending the execution of, or interrupting one or more specified routines or types thereof.

The monitor can also monitor and report the status of the receiver/decoder and the application at desired points in the execution of the application. Among the elements whose status can be so monitored and reported are the following: memory size, free memory, buffer pool characteristics, system version number, and so on; the memory contents (memory dump) of the whole memory or specified parts thereof (eg RAM, Flash, and ROM); volumes mounted, modules loaded (and current module), and variables block unit files (number, memory used, list of variables block unit files); instruction sequence status (number, number running and/or interrupted, memory used, etc); and return stack contents (ie a list of subroutines to be returned to).

In developing the application by using the authoring tool, control statements and test statements may be included therein. For this, the receiver/decoder-type unit 2021 will contain control signal receiving means for receiving control signals fed direct from the workstation, and the application will contain control statements responsive to such control signals. Such control statements may for example temporarily halt the operation of the receiver/decoder-type unit 2021. That unit also contains response means which generate test signals in response to control statements in the application which is being run by the unit. These test signals are passed direct back to the workstation, for example, via the parallel port. The workstation can thus, by means of its control signals and the test signals, monitor the operation of the application. In addition, of course, the operator can monitor the effects of the application directly on the television screen 2023.

For this, the operator will therefore design the application to include statements responsive to control signals from the workstation, runs the application on the receiver/decoder-type unit 2021 and the television set 2023, and monitors the operation of the application by means of the television set 2023 and the workstation. If there are any bugs in the application, i.e. if it does not behave exactly as wanted, the operator changes the relevant parts of the application and tests it again. Eventually, the application will run correctly. The application is then ready for actual use on the broadcast system.

It should be noted that such control statements and test statements may conveniently be left unchanged in the application when it is used in the broadcast system. The receiver/decoders of the end users will not have the circuitry for responding to these statements and generating the test signals. The execution of these statements by the real receiver/decoders will therefore be only partial, and will have no ultimate effect therein. However, the receiver/decoders will run the application is a manner which closely mimics the way in which it was run by the receiver/decoder-type unit 2021, in particular as far as the timing of the various operations is concerned. Correct operation of such an application in the test system shown in FIG. 5 will therefore be an almost certain guarantee that the application will run correctly in actual broadcast use.

It will be understood that the present invention has been described above purely by way of example, and modifications of detail can be made within the scope of the invention.

For example, the invention need not be restricted to television or radio, but could involve any form of digital broadcast system.

Each feature disclosed in the description, and (where appropriate) the claims and drawings may be provided independently or in any appropriate combination.

In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

Cross reference is made to our co-pending applications, all bearing the same filing date, and entitled Signal Generation and Broadcasting (Attorney Reference no. PC/ASB/19707), Smartcard for use with a Receiver of Encrypted Broadcast Signals, and Receiver (Attorney Reference No. PC/ASB/19708), Broadcast and Reception System and Conditional Access System therefor (Attorney Reference No. PC/ASB/19710), Downloading a Computer File from a Transmitter via a Receiver/Decoder to a Computer (Attorney Reference No. PC/ASB/19711), Transmission and Reception of Television Programmes and Other Data (Attorney Reference No. PC/ASB/19712), Downloading Data (Attorney Reference No. PC/ASB/19713), Computer Memory Organisation (Attorney Reference No. PC/ASB/19714), Television or Radio Control System Development (Attorney Reference No. PC/ASB/19715), Extracting Data Sections from a Transmitted Data Stream (Attorney Reference No. PC/ASB/19716); Access Control System (Attorney Reference No. PC/ASB/19717), Data Processing System (Attorney Reference No. PC/ASB/19718), and Broadcast and Reception System, and Receiver/Decoder and Remote Controller therefor (Attorney Reference No. PC/ASB/19720). The disclosures of these documents are incorporated herein by reference. The list of applications includes the present application.

What is claimed is:

1. A method of developing and testing a control program for an applications device, comprising the steps of:
   developing the control program on a workstation;
   passing the control program to a device emulating the applications device;
   running the control program on the emulation device; and
   generating with the control program test signals;
   characterised in that:
      the method is for developing and testing the control program for a receiver/decoder of a broadcast digital television or radio system;
      an MPEG digital television or radio signal is fed to the emulation device;
      control signals are generated by the workstation and passed to the emulation device while the control program is running on the emulation device;
      at least some of the test signals are generated in response to said control signals; and
      the test signals are returned by the emulation device to the workstation.

2. A method according to claim 1 wherein the MPEG digital television or radio signal is received direct from a broadcast signal receiver device.

3. A method according to claim 1 wherein the MPEG digital television or radio signal is received from a broadcast signal receiver device and data and/or control signals associated with the control program are inserted therein.

4. A method according to claim 1 wherein the MPEG digital television or radio signal is a synthetic signal generated under the control of the workstation to match the control program.

5. A method according to claim 1 wherein the application program includes control statements responsive to signals from the workstation and test statements which return signals to the workstation.

6. A system for developing and testing a control program for a receiver/decoder of a broadcast digital television or radio system, the system comprising a workstation and a device emulating a receiver/decoder, the workstation comprising:
   means for developing the control program,
   means for passing the control program to the emulation device,
   means for generating control signals, and
   means for passing the control signals to the emulation device while the control program is running on the emulation device; and
   the emulation device comprising:
      means for running the control program,
      receiving means for receiving an MPEG digital television or radio signal fed to the emulation device during testing of the control program,
      means for generating with the control program test signals in response to said control signals, and
      means for returning the test signals to the workstation.

7. A system according to claim 6 wherein the receiving means is adapted to receive the MPEG digital television or radio signal directly from a broadcast signal receiver device.

8. A system according to claim 6 wherein the receiving means is adapted to receive the MPEG digital television or radio signal from a broadcast signal receiver device and at least one of data and control signals associated with the control program are inserted therein.

9. A system according to claim 6 wherein the MPEG digital television or radio signal is a synthetic signal generated under the control of the workstation to match the control program.

10. A system according to claim 6 wherein the control program includes control statements responsive to signals from the workstation and test statements which return signals to the workstation.

* * * * *